United States Patent [19]

Hall

[11] Patent Number: 4,538,777
[45] Date of Patent: Sep. 3, 1985

[54] LOW THRUST DETECTION SYSTEM FOR AIRCRAFT ENGINES

[76] Inventor: Sherman E. Hall, 175 Union Ave. NE., Renton, Wash. 98055

[21] Appl. No.: 497,660

[22] Filed: May 24, 1983

Related U.S. Application Data

[63] Continuation of Ser. No. 239,423, Mar. 2, 1981, abandoned.

[51] Int. Cl.$^3$ .............................................. B64D 47/02
[52] U.S. Cl. ................................................... 244/1 R
[58] Field of Search ...................... 244/1 R; 116/265; 340/27 R, 27 SS, 27 AT, 679, 611, 606, 540, 66; 73/115, 116, 117.4; 60/39.09 R

[56] References Cited

U.S. PATENT DOCUMENTS

| | | | |
|---|---|---|---|
| 1,786,841 | 12/1930 | Gilbert | 340/27 R |
| 2,094,001 | 9/1937 | Florez | 340/27 R |
| 2,358,571 | 9/1944 | Hall | 340/27 R |
| 2,597,020 | 5/1952 | Nissen | 340/27 R |
| 2,672,889 | 3/1954 | Swanson | 340/611 |
| 2,748,372 | 5/1956 | Bunds, Jr. | 340/27 SS |
| 2,775,686 | 12/1956 | Bulkin | 340/27 R |
| 2,911,788 | 11/1959 | Lewis et al. | 60/39.09 R |
| 3,068,647 | 12/1962 | Santamaria et al. | 60/39.09 R |
| 3,512,128 | 5/1970 | Maki | 340/27 R |
| 3,668,621 | 6/1972 | Boyd | 340/27 R |

*Primary Examiner*—Galen L. Barefoot
*Attorney, Agent, or Firm*—Cole, Jensen & Puntigam

[57] ABSTRACT

Aircraft engine low thrust detection system having sensors for each engine mounted on the engine nacelle in the slip stream of each propeller. A given amount of decrease in engine thrust is detected by a thrust sensor and a signal is generated for a control device. The control device in turn activates a visual signal on the appropriate propeller control level in the cockpit informing the pilot which engine is losing thrust and whether the power loss is partial or total. Aural signals are also installed with different pitches to assist the pilot in identifying the engine which is losing power.

6 Claims, 7 Drawing Figures

LOW THRUST DETECTION SYSTEM FOR AIRCRAFT ENGINES

This is a continuation of application Ser. No. 239,423, filed Mar. 2, 1981, now abandoned.

BACKGROUND OF THE INVENTION

The invention relates generally to the field of aircraft safety and more particularly to a system for instantly, clearly and precisely identifying the engine on which power is being lost so that corrective and emergency safety measures may be undertaken.

Those skilled in the art are aware that accidents in twin engine aircraft, due to engine failure, have a fatality rate that is roughly four times higher than single engine aircraft. Theoretically and as a practical matter, two engines should make an aircraft safer, and thus it becomes apparent that a reason exists for the higher fatality rate with twin engine aircraft. Operators of aircraft and pilots are aware that emergency procedures are complicated for engine failures in flight and are further aware that emergency procedures require that pilot action be taken immediately. Obviously, engine instruments can be used to identify which engine has failed, but such identification takes time and adds to the confusion during an emergency. Statistics indicate that many pilots have panicked during these emergencies, further emphasizing the need for a system which will assist the pilot rather than confuse him. Furthermore, records demonstrate that experienced pilots have misidentified the failed engine and then shutdown the only operating engine. Again, this points up the need for a simple system which will immediately and clearly identify the failed engine and prevent misidentification, panic, plain error or confusion.

It is recognized that there are several approaches which can be designed to sense power in or thrust from an engine but most approaches to the problem are complex or not reliable. For instance, it is quite possible to use existing engine instruments to activate an engine failure indicator. These would include attaching the failure indicator to manifold pressure, tachometer, fuel flow, exhaust temperature or oil pressure. However, each of these instruments listed as an example are able to indicate normal readings during an engine failure or loss of power depending on the type of failure involved. A combination of such indications may be used but these present a complex design problem. Engine gear box can be designed to supply a positive or negative torque indication and this is done on some aircraft. But again, it is complex and expensive and generally only designed into the original gear box.

Many turbo prop type aircraft use a torque sensing system to detect negative torque during an engine failure and to provide a signal which is used to feather the propeller. Such a system has failed to satisfy the problem and additionally is expensive and has not been used on lower cost piston engine aircraft. Furthermore, it has to be designed into the original power plant gear box and cannot be added to existing aircraft.

Immediately after World War II there existed mainly high powered military or commercial aircraft. These aircraft had high control forces that are required to maintain control after an engine has failed. However, aircraft certified today by the FAA must have pilot operating control forces within established limits. Also the FAA requires that the aircraft have a controllability factor allowing the pilot to maintain straight flight within five degrees after an engine has failed. Among those systems which have been tried is that shown in U.S. Pat. No. 2,597,020 which uses pressure sensors in the slip stream to effect a control movement of the aircraft. However, it is easier to design the basic aircraft with adequately sized control surfaces rather than to install a complex automatic system as is embodied in the patent. Failure of the control system as setforth in the patent would mean the aircraft is uncontrollable during an engine failure and accordingly, such a system probably would not be certified by the FAA for civil use under present regulations. Additionally, such a system as shown in the identified prior art patent is not needed on light twins because such aircraft already have an adequate control in accordance with current FAA regulations.

SUMMARY OF THE INVENTION

The low thrust detector system of this invention comprises a thrust sensor mounted on the nacelle of each engine in the slip stream of its propeller. A differential signal generating means is provided to sense any partial or total loss of thrust from either of the engines. If a failure does occur, the control means will energize visual indicators on the propeller controls so that the pilot has visual indication of which engine is failing, and whether the failure is partial or total. In addition, an audio alarm signal is provided with one audio pitch for the left hand side and a different audio pitch for the right hand side of the aircraft.

Accordingly, it is among the advantages and features of this invention to provide a low thrust detector system which is simple to install either as original equipment in a new aircraft or as an add-on safety feature to existing aircraft. Operation of the low thrust detector system is extremely simple, requiring no action by the pilot and which supplies needed indication instantaneously. The system can be used on many existing aircraft models and certification has been extended to many models of aircraft. This system has interchangeable parts even for different types of aircraft. The system simplifies emergency procedures for engine failure providing immediately identification of power loss, either partial or complete, without the necessity for reading and/or interpreting engine instrumentation. This system provides safer single engine emergency operation for twin engine aircraft. The system lessens if not eliminates the fatal mistake of misidentification of a failed or failing engine. The system identifies unsymmetrical power conditions to the pilot who becomes aware of power conditions without checking on engine instruments. The system can be left on at all times or can be used merely for takeoff and landing if desired. The system provides both visual and audio identification of the failing or failed engine. Also, the propeller control level itself is identified by the indicators in the system. The system prevents the pilot from mistakenly shutting down the operating engine.

BRIEF DESCRIPTION OF DRAWNGS

DESCRIPTION OF PREFERRED EMBODIMENT

Figure 1:
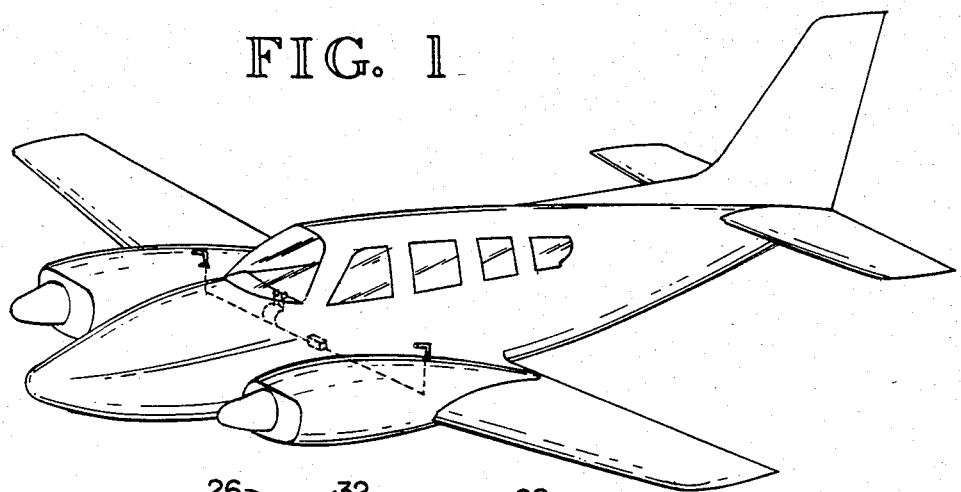
FIG. 1 shows an aircraft on which the system is installed and the approximate position of the thrust sensors on the engine nacelles.

Referring now to the drawings, it will be seen that a twin-engine aircraft is shown in FIG. 1 to illustrate the location and mounting of the low thrust detection system of this invention.

Figure 2:
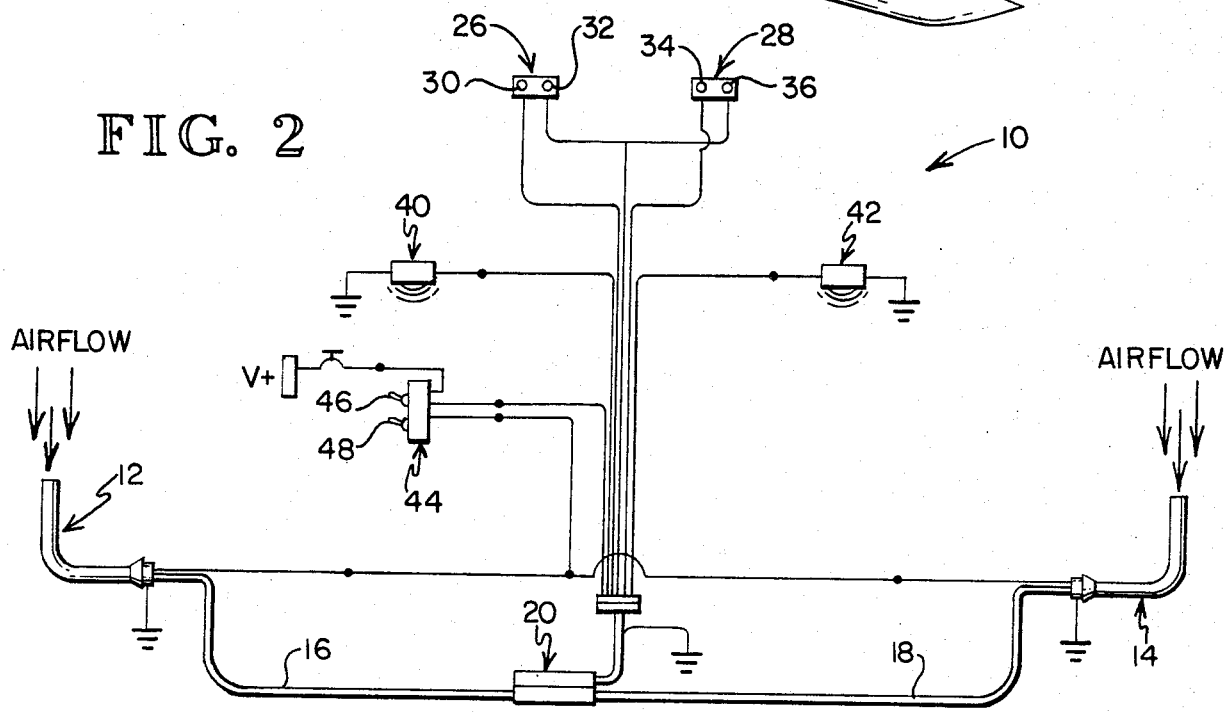
FIG. 2 is a partial schematic of the electronics of the system.

FIG. 2 shows a schematic of the low thrust detector system of this invention including thrust or pressure sensor unit 12 for the left side of the aircraft or left engine and sensor unit 14 for the right side of the aircraft. FIG. 1 shows the sensors 12 and 14 mounted on the engine nacelles in the slip stream behind the prop of each engine. The sensors are responsive to the slip stream airflow and direct a pressure flow of air through pneumatic lines to a control switch. Each sensor is provided with a heating unit to eliminate the formation of or to remove frost or ice. A pneumatic line 16 from the left sensor 12 and a line 18 from the right sensor 14 transmit pressure from the thrust sensors to the switch unit 20, the details of which will be described in greater detail hereinafter.

In the cockpit of the aircraft will be located left and right propeller control levers 22 and 24 respectively. Below the hand or finger grip of each of the prop control levers 22 and 24 will be located a pair of visual warning light indicators 26 and 28. On each of the visual indicators 26 and 28 will be a left orange light 30 showing a partial power failure and a right red light 32 showing a complete power failure in the left engine. Likewise, for the right engine the indicator 28 will have left indicator light 34 colored orange which will indicate a partial engine failure and a right indicator light 36 which is red to indicate a complete power failure on the right engine.

Also as part of the system will be audio indicator 40 such as a buzzer for the left engine as well as right audio generator 42 for the right engine. A master switch 44 has two switches 46 and 48, switch 46 being a system on-off switch and switch 48 activating the heater circuit for the sensor heaters (not shown).

Figure 3:
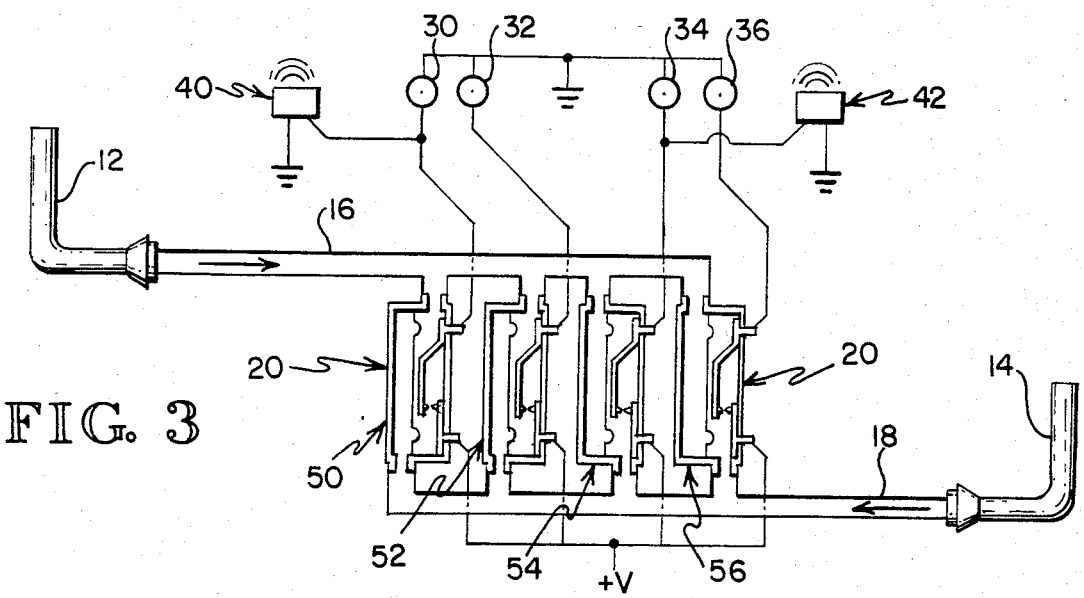
FIG. 3 shows detail of the diaphragm switches for sensing partial or complete engine failure in either of the engines.
Figure 4:
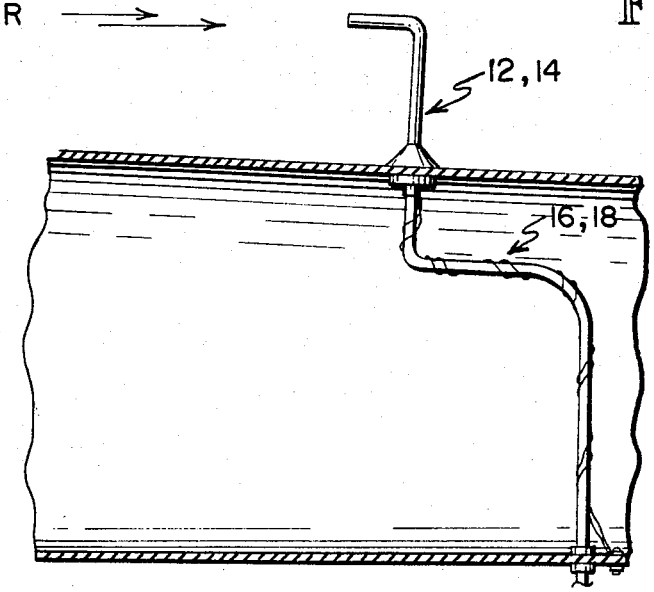
FIG. 4 is a partial cross-section view showing the details of the mounting of airflow sensor on an engine nacelle.
Figure 5:
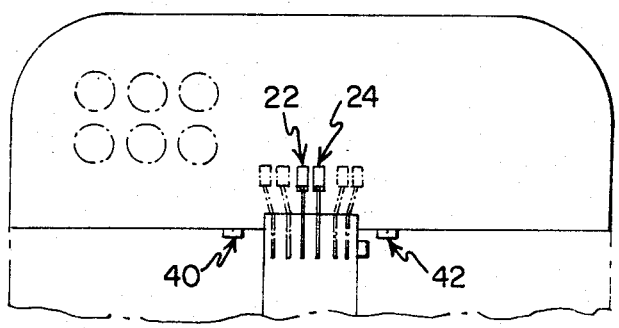
FIG. 5 is a diagrammatic view of an engine cockpit showing the throttles in dash-dot lines and the propeller control levers in solid lines.
Figure 6:
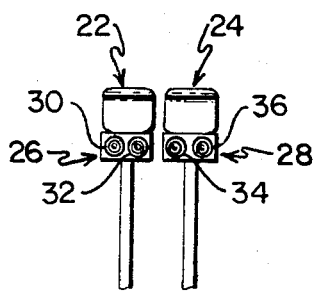
FIG. 6 is a partial elevation view of the front side of the propeller control levers.
Figure 7:
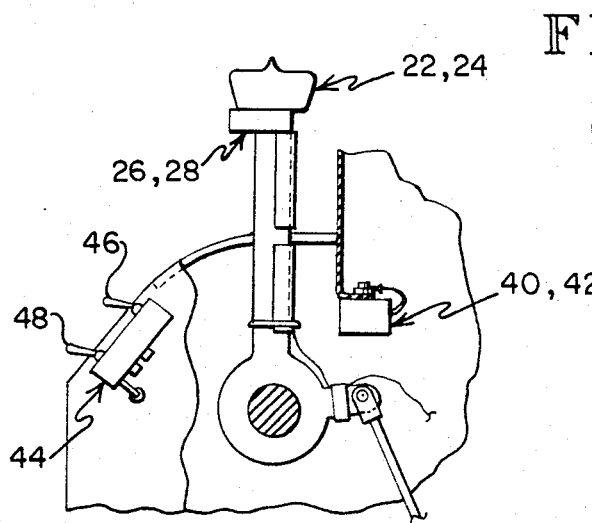
FIG. 7 is a partial side elevation view showing additional details of the propeller control levers.

FIG. 3 shows the arrangement of diaphragm switches to which the pneumatic lines 16 and 18 connector sensors 12 and 14. The diaphragm switches 50, 52, 54 and 56 are essentially identical in construction. It will be seen that pneumatic line 16 from the left engine sensor 12 leads to the contactor side of the diaphragm switch on switches 50 and 52. Pneumatic line 16 also connects to the non-contactor side of the diaphragm on right engine switches 54 and 56. Pneumatic line 18 from the right engine sensor 14 leads to the contactor side of switches 54 and 56 and to the non-contactor side of the switches 50 and 52. It will be appreciated that when both engines are running as in normal operation, the thrust output of both engines is equal and therefore the pressure in pneumatic lines 16 and 18 is equal and therefore the pressure is equal on both side of the diaphragms on switches 50 through 56. Thus, all switch contacts remain open and no electrical circuit is activated.

As will be appreciated, normal changes in power by the pilot normally are symmetrical from idle power in a descent, medium power during cruise and full power during climb. Engine failures are critical and happen most frequently during takeoff and climb where full engine power is utilized. Since this system depends on differential thrust pressure to create a differential pressure in the switch unit 20, it can be seen quite easily that the system functions well during the critical part of the flight where high power is developed on one engine and there has been either a partial or total failure of power on the other engine.

Assume for the purposes of illustration that the left engine thrust is lower than the right engine in direct proportion to its power loss. Line 16 thus will carry a lower pressure than line 18 and a differential in pressure will exist across the diaphragm in switches 50 and 52. In this manner, a force is applied from the non-contactor side of the diaphragm to close the contacts of switches 50 and 52. Switch 50 has been preset to allow contact closure during a predetermined amount or partial power failure. The spring contact pressure in switch 52 has been preselected and preset so as to allow contact closure only during complete power failure. Thus, if the loss of engine thrust on the left side is only partial switch 50 closes and activates the orange or amber light 30 and the aural indicator 40. The aural indicator 40 gives 3 to 4 pulses whenever the thrust on the left engine is 15% lower than the right engine. The left engine aural indicator 40 is easily distinguished by a high pitched buzzing sound.

With the distinct left engine audio alarm 40 and the visual light 30 indicating a partial engine failure in the left engine, the pilot is clearly and accurately informed as to which engine has failed and alerts him to take corrective action. To feather the correct propeller, the pilot need only select the control lever 22 or 24 which has the activated indicator. It will be appreciated that if there is total loss of thrust in the left engine, then switch 52 is actuated and the red indicator light 32 activates to alert the pilot.

The two right visual indicators 34 and 36 as well as the low pitch aural indicator 42 function in the same way as the left engine switches in order to indicate either a partial engine failure through switch 54 or a total engine failure through switch 56.

What is claimed is:

1. Thrust loss detection system for aircraft with at least two engines having propellers driven thereby, comprising:

(a) a single, engine thrust loss sensor means for each engine mounted so as to be located in the slip stream of its respective engine propeller and being responsive to air pressure from the engine propeller, (b) a plurality of electrical switch means located within the body of said aircraft and connected by pneumatic conduit means to each of said sensor means for transmitting air pressure from each of said sensors to said plurality of switch means, said switch means being responsive to predetermined differences in thrust between the engines such that upon the occurrence of a predetermined amount of partial loss to full loss of engine thrust, said electrical switch means will be energized to produce an electrical signal indicative of either a partial or total loss of power in a given engine, (c) visual signal indicator means for each engine attached to the cockpit propeller controls and connected to said switch means, said visual signal indicator means signalling to the aircraft operator which engine is losing power so that corrective action can be taken.

2. The thrust loss detection system according to claim 1 and wherein said plurality of electrical switch means comprises a series of diaphram switches each of which switches is connected to the pneumatic conduit means of each sensor so that air pressure from each propeller is transmitted to each of said switches so that said switches will in the event of power loss in a given engine sense said power loss and produce said electrical signal in response thereto.

3. The thrust loss detection system according to claim 2 and wherein said visual indicator means comprises a pair of differently colored lights attached to the propeller control knobs such that one light indicates a predetermined partial loss of thrust on its respective engine and the other light indicates up to full thrust loss on the same engine.

4. The thrust loss detection system according to claim 3 and in which aural indicator means are added for each visual indicator in such a way that differently pitched sound frequencies are used to assist in identifying the engine that is losing or has lost power.

5. The thrust loss detector system according to claim 4 and wherein said visual indicator is located in direct view of the pilot.

6. The thrust loss detection system according to claim 1 and in which said sensor means is located on the nacelles of said engine.

* * * * *